United States Patent
Simonsson et al.

(10) Patent No.: US 9,693,249 B2
(45) Date of Patent: Jun. 27, 2017

(54) UE SIGNAL QUALITY MEASUREMENTS ON A SUBSET OF RADIO RESOURCE ELEMENTS

(71) Applicant: Telefonaktiebolaget L M Ericsson (publ), Stockholm (SE)

(72) Inventors: Arne Simonsson, Gammelstad (SE); Bo Hagerman, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

(21) Appl. No.: 14/663,588

(22) Filed: Mar. 20, 2015

(65) Prior Publication Data
US 2015/0195729 A1 Jul. 9, 2015

Related U.S. Application Data

(63) Continuation of application No. 13/217,593, filed on Aug. 25, 2011, now Pat. No. 9,008,200.
(Continued)

(51) Int. Cl.
*H04W 72/08* (2009.01)
*H04W 24/08* (2009.01)
(Continued)

(52) U.S. Cl.
CPC ........... *H04W 24/08* (2013.01); *H04W 24/10* (2013.01); *H04W 72/085* (2013.01); *H04W 72/044* (2013.01)

(58) Field of Classification Search
CPC ...... H04B 7/12; H04B 7/0621; H04B 7/0626; H04L 1/04; H04L 5/0007; H04L 5/0023;
(Continued)

(56) References Cited

U.S. PATENT DOCUMENTS

2006/0276203 A1* 12/2006 Sambin .................. G01S 5/0036
455/456.1
2009/0270108 A1 10/2009 Xu
(Continued)

FOREIGN PATENT DOCUMENTS

| EP | 2 107 850 | 10/2009 |
|---|---|---|
| WO | WO 2009/052754 | 4/2009 |
| WO | WO 2009/113951 | 9/2009 |

OTHER PUBLICATIONS

International Search Report and Written Opinion of the International Searching Authority mailed Mar. 5, 2012 in corresponding Application No. PCT/SE2011/051022.
(Continued)

*Primary Examiner* — Vineeta Panwalkar
(74) *Attorney, Agent, or Firm* — Baker Botts, LLP (57) ABSTRACT

A user equipment (UE) receives a radio signal which includes a time-frequency grid of radio resource elements. A UE detector measures a signal quality parameter associated with a subset of the radio resource elements in the time-frequency grid. The subset of the radio resource elements is less than a total number of the radio resource elements in the time-frequency grid and corresponds to an individual radio channel. Radio circuitry in the UE reports to a network node the signal quality parameter measured for the subset of the radio resource elements in the time-frequency grid to enable an operation related, for example, to the individual radio channel.

20 Claims, 3 Drawing Sheets

Related U.S. Application Data (60) Provisional application No. 61/493,706, filed on Jun. 6, 2011.

(51) Int. Cl.
*H04W 24/10* (2009.01)
*H04W 72/04* (2009.01)

(58) Field of Classification Search
CPC ... H04L 5/0053; H04L 5/0057; H04L 1/0027; H04L 2025/03802; H04W 72/04; H04W 24/08; H04W 24/10; H04W 72/085; H04W 72/044

See application file for complete search history.

(56) References Cited

U.S. PATENT DOCUMENTS

2009/0316647 A1  12/2009  Chen et al.
2012/0155519 A1   6/2012  Futagi et al. ................ 375/219

OTHER PUBLICATIONS

3GPP TS 36.214 V10.1.0 (Mar. 2011), 3rd Generation Partnership Project; Technical Specification Group Radio Access Network; Evolved Universal Terrestrial Radio Access (E-UTRA); Physical layer; Measurements (Release 10).
3GPP TS 36.331 V10.1.0 (Mar. 2011), 3rd Generation Partnership Project; Technical Specification Group Radio Access Network; Evolved Universal Terrestrial Radio Access (E-UTRA); Radio Resource Control (RRC); Protocol specification Release 10.
Second Office Action issued for Chinese Patent Application for Invention No. 201180071435.X—Apr. 24, 2017.

\* cited by examiner

UE SIGNAL QUALITY MEASUREMENTS ON A SUBSET OF RADIO RESOURCE ELEMENTS

PRIORITY

This application is a continuation, under 35 U.S.C. §120, of U.S. application Ser. No. 13/217,593 filed Aug. 25, 2011 which claims the benefit, under 35 U.S.C. §119(a), of U.S. Provisional Application Ser. No. 61/493,706, filed Jun. 6, 2011, all of which are incorporated herein by reference.

TECHNICAL FIELD

The technology relates to radio communications, and in particular, to measurement of radio signal quality by one or more user equipment (UE) radios.

BACKGROUND

User Equipments (UEs) are often used to measurement various parameters in a radio communications network including some sort of measure of signal quality of received symbols. There are many different types of signal quality measurements such as received signal strength indicator (RSSI), Reference Signal Received Power (RSRP), Reference Signal Received Quality (RSRQ), and others. In LTE, Reference Signal Received Quality (RSRQ) is defined in 3GPP, "Evolved Universal Terrestrial Radio Access (E-UTRA); Physical layer; Measurements," TS 36.214, incorporated herein by reference, as a ratio N×RSRP/(E-UTRA carrier RSSI), where RSSI is measured (1) only in orthogonal frequency division multiplexed (OFDM) symbols containing reference symbols for antenna port 0 in the measurement bandwidth or (2) over all OFDM symbols in indicated subframes if higher layer signaling indicates certain subframes for performing RSRQ measurements. Ultimately, the RSRQ reported by the UE to the network is an average for the OFDM symbols include in a received OFDM subframe. This can be problematic in some scenarios.

One example scenario is Heterogeneous Networks (HetNets) which combine macro and pico base stations or other small cells within a wireless communication system. In a HetNet scenario with Remote Radio Unit (RRU), the pico base station transmission(s) are often synchronized with the macro base station transmission. Expanding the coverage range for a pico cell may be used to increase the amount of UE traffic handled by the pico cell and also to improve the quality of the uplink radio link and UE bit rate. Although locating several pico base stations within the cell coverage of a macro base station will typically increase the network capacity, interference between the macro and pico base stations must be managed. For example, a drawback with expanding the coverage range for a pico cell can be decreased quality and increased interference on the downlink.

Because such downlink interference can be severe, it may be desirable to protect control signaling on control channels like the Physical Data Control Channel (PDCCH). In LTE, the size of the PDCCH can be dynamically set per subframe which means that different coordination schemes can be used such as an Almost Blank Subframe (ABS) scheme or a fractional PDCCH load scheme to reduce transmissions on the PDCCH channel, thereby reducing downlink interference. The interference may also differ on different channels in the pico cell, e.g., the PDCCH may experience less interference than the Physical Data Shared Channel (PDSCH). Such coordination schemes typically result in undesirable interference patterns that undermine the performance of reliable measurements.

The RSRQ is based on RSSI measured on symbols across multiple different channels resulting in an average signal quality for multiple channels, which in this example includes the PDCCH, the Physical Control Format Indicator Channel (PCFICH), and the physical downlink shared channel (PDSCH). But this average signal quality may not be a satisfactory measure of the received signal quality for an individual one of those channels included in the average. For example, the detected average RSRQ on measured on the downlink subframe by the UE may not be an accurate measurement of the RSRQ on the PDCCH included in that downlink subframe. The quality per individual channel depends on the interference difference which cannot be identified and removed when the interference over the symbols on which the signal quality is measured is unknown.

SUMMARY

The technology described in this application enables one or more operations related specifically to individual channels in a wireless communication network including a user equipment (UE) and a network node being in connectivity with each other. Initially, the UE receives a signal measurement configuration that includes the subset of the radio resource elements in the time-frequency grid. The UE receives a radio signal which includes a time-frequency grid of radio resource elements and measures a signal quality parameter associated with a subset of the radio resource elements in the time-frequency grid. The subset of the radio resource elements is less than a total number of the radio resource elements in the time-frequency grid and corresponds to an individual radio channel. The UE reports to a network node the signal quality parameter measured for the subset of the radio resource elements in the time-frequency grid to enable an operation related to the individual radio channel.

Non-limiting examples of a signal quality parameter are Reference Signal Received Power (RSRP), Reference Signal Received Quality (RSRQ), and/or Channel State Information (CSI).

In one non-limiting embodiment, the time-frequency grid corresponds to one subframe, and the subset of the radio resource elements is a subset of symbols within the one subframe. For example, the time-frequency grid corresponds to one subframe of orthogonal frequency division multiple access (OFDM) symbols.

The time-frequency grid may include multiple radio channels in addition to the individual radio channel, where each of the multiple radio channels includes a different subset of the radio resource elements. In that case, the UE measures and reports a signal quality parameter for each subset of the radio resource elements in the time-frequency grid corresponding to plural ones of the multiple radio channels. One of the multiple radio channels may be a control channel and another of the multiple radio channels may be a shared data channel.

In another example embodiment, the time-frequency grid includes a reference signal assigned to a subset of the radio resource elements different from those radio resource elements corresponding to the multiple radio channels. The UE measures and reports a signal quality parameter specific to just the subset of the radio resource elements in the time-frequency grid corresponding to the reference signal.

In an example implementation, the signal measurement configuration is provided to the UE as a radio resource control message that includes an information element (IE) specifying the subset.

If desired, the UE may measure a signal quality parameter associated with the subset of the radio resource elements in the time-frequency grid on a sequence of received time-frequency grids according to a time sequence pattern identifying time-frequency grids to be measured by the UE and reported to the network.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of non-transitory computer-readable memory, such as solid-state memory, magnetic disk, or optical disk containing an appropriate set of computer instructions that would cause a processor to carry out the techniques described herein.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown. The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented. Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology in this application applies to any radio communications system and/or network where radio resources are allocated in the context of a radio resource element grid having at least two resource dimensions or components. For example, OFDM type communications often employ a time-frequency resource element grid where each radio resource element includes a time component and a frequency component. Each resource element corresponds in this example to an OFDM symbol. The radio resource element grid in this application supports multiple radio communication channels (and possibly reference elements) that are allocated to certain radio resource elements (locations) in the radio resource element grid. For ease of description, each radio communication channel corresponds to or is allocated a subset of the time-frequency resource element grid.

The technology described in this application defines a signal quality parameter, e.g., RSRQ, for a subset of elements in a time-frequency radio resource element grid for a downlink subframe based on signal quality measurements, e.g., RSRP, RSSI, and Channel State Information (CSI), on that subset of radio resource elements. In one non-limiting example embodiment, a UE measures radio resource elements in the subframe separately for two or more radio channels to provide an individual or per channel quality measure rather than an average quality measure for the two or more channels. In another non-limiting example embodiment, a UE measures radio resource elements in the subframe separately for a specific type of reference signal to provide an individual signal quality of that reference signal. A part or portion of the subframe is referred to herein as a "subset" of the subframe. Example advantages of this technology include improved UE radio signal quality measurement and more accurate reporting. This can be particularly useful in heterogeneous networks that employ pico cell range extension. The technology may also be advantageously used with different advanced interference coordination schemes, frequency reuse schemes, and/or power setting/control schemes.

Figure 1:
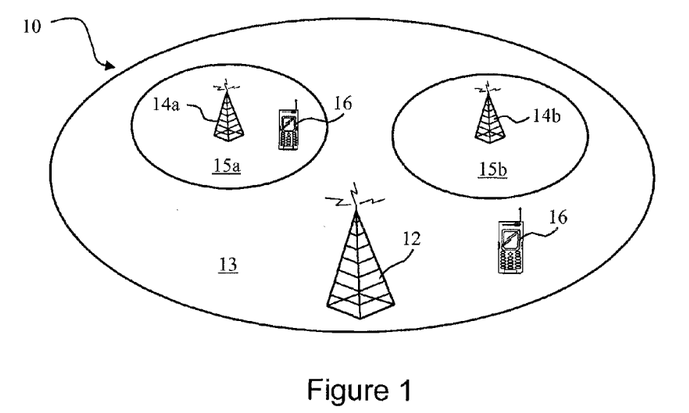
FIG. 1 illustrates a radio communications network having a heterogenous deployment.

FIG. 1 shows an example heterogeneous network with one macro base station 12 serving a macro cell 13 and two pico base stations 14a, 14b serving respective pico cells 15a, 15b. All of the base stations can communicate with UEs 16 that are in range. As mentioned in the background, heterogeneous networks may be particularly susceptible to interference when the range of one or more pico base stations is extended. In this case, it would be helpful to know the signal quality for each of one or more individual downlink channels to determine the impact of such interference on a per channel basis. This would also be helpful in other types of radio networks.

Figure 2:
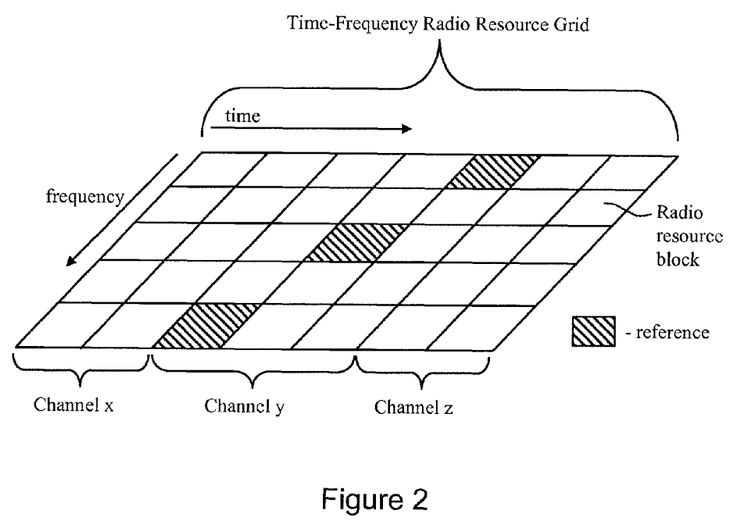
FIG. 2 illustrates an example time-frequency radio resource grid.

FIG. 2 illustrates an example time-frequency radio resource grid of radio resource elements as described above. Certain ones of the radio resource elements or a part or subset of the grid are/is allocated to each different radio channel, and if desired, to each of one or more reference signals. Reference signals are typically used by the UE for timing, synchronization, channel estimation, equalization, demodulation, and perhaps other radio communication functions.

Figure 3:
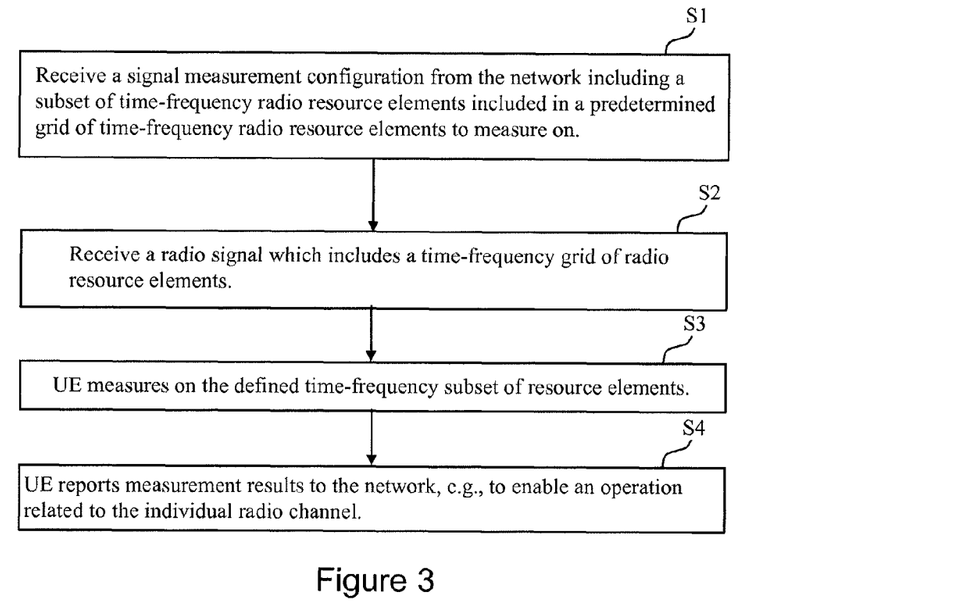
FIG. 3 is a non-limiting, example flowchart illustrating example procedures for a UE measuring and reporting a signal parameter for a subset of the radio resource elements in the grid of FIG. 2.

FIG. 3 is a non-limiting, example flowchart illustrating example procedures for a UE measuring and reporting a signal parameter for a subset of the radio resource elements in a downlink subframe. The UE receives information from the network, e.g., a measurement configuration signal, that indicates a specific part or parts (a subset) of a downlink subframe on which the UE should perform signal quality measurements (step S1). The indication to the UE as to the specific subset of the subframe may be provided in any suitable fashion from the network or from some other source. Alternatively, the specific subset of the subframe may be pre-stored in the UE.

A subset may include a single channel out of multiple radio channels included in the subframe. The subset may also or alternatively include a reference signal. Here, the subframe received is a two dimensional subframe that includes both frequency and time resource units like that shown in FIG. 2. The configuration may also specify a subset time and/or frequency for the UE to measure on. Thereafter, the UE receives (step S2) a radio signal which includes a time-frequency grid of radio resource elements and which experiences an interference pattern. The UE then measures one or more signal quality parameters on the defined time-frequency subset of radio resource elements (step S3), and reports the signal parameter measurement results to the network (step S4).

Advantageously, the measurement report specifies the signal parameter measurement results for a subframe subset, such as an individual channel or reference signal, rather than just signal parameter measurement results averaged over the entire subframe. This means that the network receives more specific and more accurate information which enables better link adaptation, transmission mode selection, power control, interference management, and coordination between different types of base stations. Ultimately, this results in improved performance, service quality, and capacity.

Figure 4:
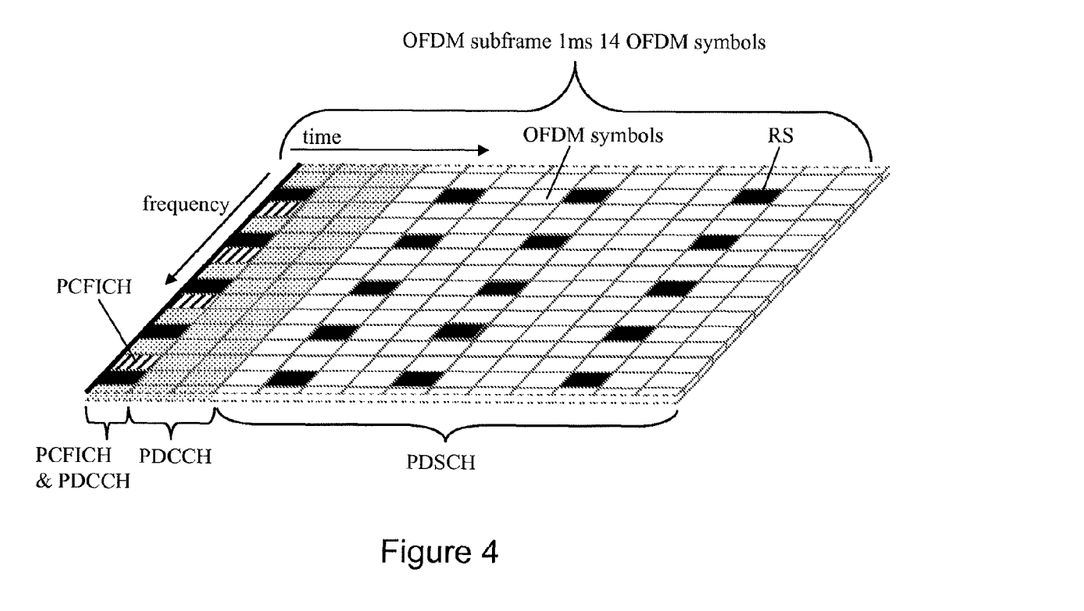
FIG. 4 illustrates another example time-frequency radio resource grid for use in an OFDM-based LTE communications system UE measuring and reporting a signal parameter for a subset of the radio resource elements in the grid of FIG. 4.

A specific but non-limiting example is now provided in an LTE context. FIG. 4 illustrates an LTE downlink subframe structure. Each radio resource element block corresponds to an orthogonal frequency division multiplex (OFDM) symbol. The 1 ms subframe (a time-frequency grid) includes 14×14 OFDM symbols defined in time (the horizontal axis) and frequency (axis into/out of page). Different individual LTE channels are included in the subframe as are known reference symbols (RS) (shown as solid black blocks). The striped blocks correspond to the physical control format indicator channel (PCFICH), the dotted blocks correspond to the PDCCH, and the white blocks correspond to the PDSCH. Each different channel is a subset of the subframe. Each reference symbol may also be a subset of the subframe, if desired.

Any suitable signal quality measurement parameter(s) may be used. Non-limiting, example radio quality measurements used in LTE include RSRP, RSRQ, and CSI, e.g., as defined in TS 36.214, RSSI, signal to interference and noise ratio (SINR), e.g., after antenna combining, transmission power, transmission power headroom, e.g., as defined in TS 36.133.

Figure 5:
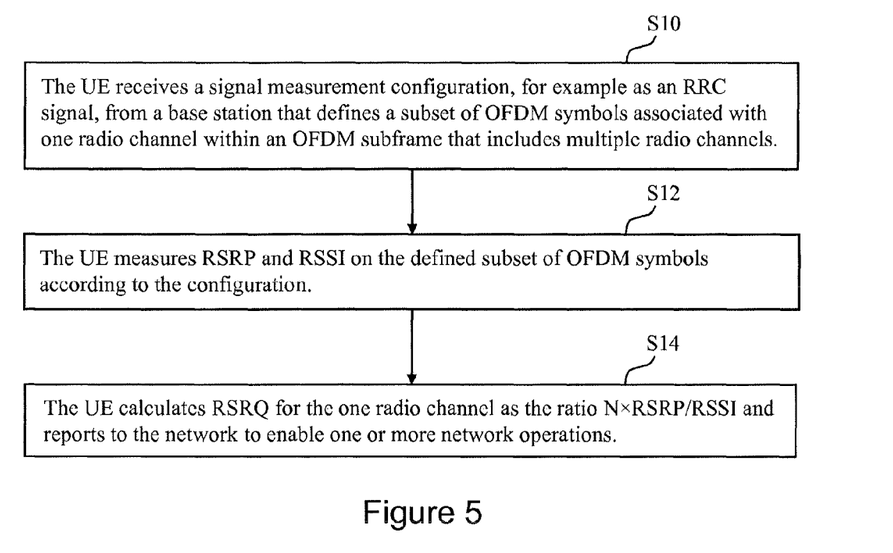
FIG. 5 is a non-limiting, example flowchart illustrating example procedures for a UE measuring RSRP and RSSI and reporting a RSRQ for a subset of OFDM symbols in the OFDM subframe of FIG. 4.

FIG. 5 is a non-limiting, example flowchart illustrating example procedures for a UE measuring RSRP and RSSI and reporting a RSRQ for a subset of OFDM symbols in the OFDM subframe of FIG. 4. The UE receives a measurement configuration, for example via an RRC signal, from a base station, e.g., an eNodeB (eNB), to which the UE is connected. The measurement configuration defines a subset of OFDM symbols associated with one or more radio channels within the OFDM subframe that includes multiple radio channels (step S10). The defined subset may also or alternatively include one or more reference symbols. The UE measures the RSRP and RSSI on the defined subset of symbols according to the measurement configuration (step S12). The UE calculates the RSRQ as the ratio N×RSRP/RSSI, where N equals the number of Resource Blocks (RBs), and reports the subset measured RSRQ to the network (step S14). In other words, the reported signal quality measurements are specific to just the subframe subset. So if the indicated subframe subset is the PDCCH symbols, the reported signal quality measurement is specific to the PDCCH.

The RSRQ measurement value(s) in the report may be used, for example, for radio resource control (RRC) measurement reporting, handover evaluation, and other radio resource features. The measurement configuration may be received from a macro or pico base station, and the report may be sent to a macro base station or pico base station. For RRC measurement reporting, multiple subsets may be configured, e.g., to provide an individual signal quality measurement for the PDSCH RSRQ (one subset) and for the PDCCH RSRQ (another subset).

Other example embodiments divide the subframe into smaller subsets or more subsets. For example, with dynamic PDCCH allocation, the number of PDCCH symbols may be adjusted to the control signaling load. In that case, the PCFICH in the pico cell may experience more interference than the PDCCH. Three RSRQ measurement subsets may then be configured: a PDSCH RSRQ measurement subset, a PDCCH RSRQ measurement subset, and a PCFICH RSRQ measurement subset.

As mentioned above, the RSRP measurement may be configured as an RSRQ defining subset of Reference Symbols (RS) that should be included in the UE measurement. Multiple different signal quality subsets may be defined that result in multiple individualized signal quality reports.

Another non-limiting example embodiment of RSRP measurement reporting by a UE for idle mode mobility may be as follows. First, the UE receives a signal quality measurement configuration, included for example in an RRC signal, that defines a subset of reference symbols (RS) within a subframe. The UE measures the RSRP on the defined subset of reference symbols according to the configuration on serving and neighbor base station transmissions. The measured RSRP values for those received reference signals may then be used by the UE for idle mode cell selection.

As mentioned above, the configuration of the symbol subset for the UE to perform signal quality measurement may be provided using an RRC protocol message, (the RRC protocol is defined in 3GPP, "Radio Resource Control (RRC); Protocol specification", TS 36.331 incorporated herein by reference), or some other suitable protocol. For example, in the RRC "RadioResourceConfigDedicated" message, the MeasSubframePattern configuration parameter defining the subset of subframes to be measured on is defined. Similarly a measSymbolPattern-Sery may be added as a parameter that defines a subset of symbols within one subframe to measure on.

With respect to defining a symbol subset for serving cell measurements, the symbol subset configuration may for example be in time only, such as defining which of the 14 symbols in time that should be measured over the whole frequency band. The symbol subset configuration may also be specified in frequency, such as defining which symbols or resource blocks should be measured by the UE. It may also be a combined time and frequency configuration.

An alternative non-limiting example way to configure a subset of symbols in a subframe for a UE to measure signal quality is by specifying a specific channel, e.g., PCHICH, PDCCH, or PDCSH.

A non-limiting example definition of an RRC configuration information element that may be added to the 3GPP, "Radio Resource Control (RRC); Protocol specification", TS 36.331 that enables various measurement symbol subset configurations for a UE is as follows: MeasSymbolPattern. This information element (IE) specifies a time and frequency domain measurement resource restriction. The first/leftmost bit of the IE corresponds to the symbol #0 of the subframe. A value of "1" denotes that the corresponding symbol in time is to be included in the UE's signal quality measurement.

A non-limiting example MeasSymbolPattern information element may be as outlined in the following pseudo-code:

```
-- ASN1START
MeasSymbolPattern-r10 ::= CHOICE {
    symbolPatternTime BIT STRING (SIZE(14)),
    symbolPattern    CHOICE {
        symbolPatternTime  BIT STRING (SIZE(14)),
        symbolPatternChannel
            ENUMRATED {PDCCH, PDSCH, PCFICH}
    }
}
-- ASN1STOP
```

A further example embodiment is to combine symbol measurement restrictions with the subframe measurement restrictions as described above. Further, this combination may be applied for multiple measurement configurations with different subframe restrictions simultaneously.

Figure 6:
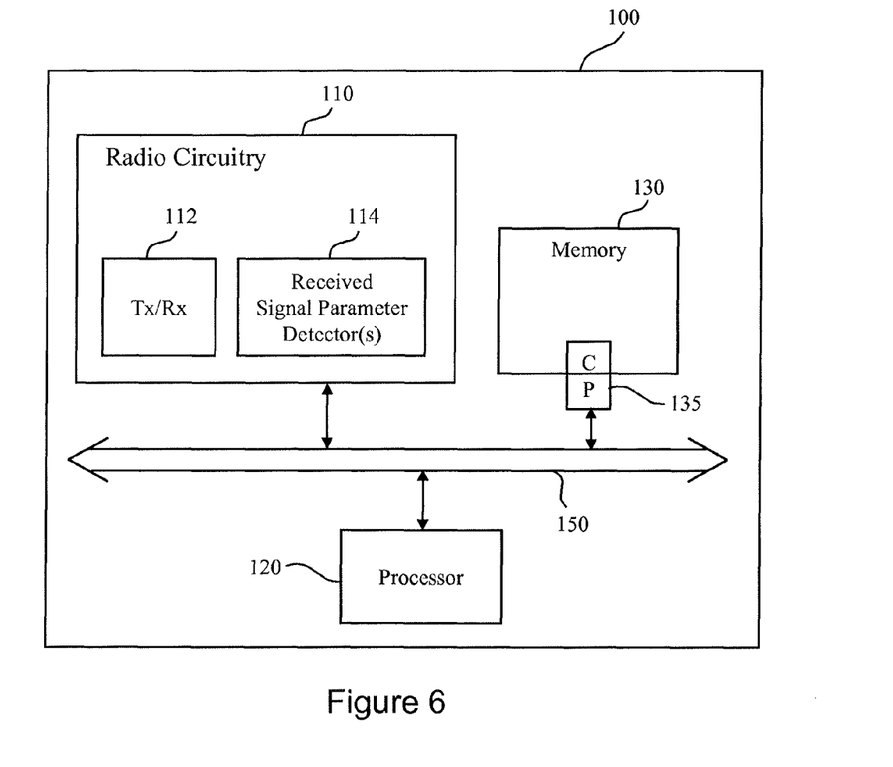
FIG. 6 is a non-limiting, example function block diagram of a UE that may be used to implement the procedures in FIGS. 3 and 5.

FIG. 6 is a non-limiting, example function block diagram of a UE that may be used to implement the procedures outlined in FIGS. 3 and 5. Such a user equipment may be a mobile radio telephone or a portable computing device with radio communication for example. The UE 100 may include, inter alia, a radio circuitry 110, a data processor 120, and a computer-readable medium 130 in the form of a memory. The radio circuitry 110 includes a transceiver (Tx/Rx) 112 and one or more received signal parameter detector(s) 114 to detect or measure a desired signal quality parameter of a specified subset of a subframe. The one or more received signal parameter detector(s) 114 may perform symbol grid identification and configure the appropriate symbol pattern measurement over one or more measurements patterns. The processor 120 may instruct the signal parameter detector(s) 114 of the subset. The transceiver (Tx/Rx) 112 enables connection to a serving cell (a network node) and can also enable detecting neighboring cells (base station nodes) in a cell search process. The transceiver (Tx/Rx) 112 may be referred to as a communication interface and may also include separate receiving and transmitting modules. The UE's subframe subset measurement configuration may be stored in memory 130 and/or received from the network, for example, from the serving cell, via transceiver 112. The processor 120 may determine from the measurement configuration the subset of symbols to be measured within a subframe, e.g., for RSRQ, RSRP, and/or RSSI, and controls the received detectors to make the specified measurements. The processor 120 may store the measured values in the memory 130 before reporting them in a measurement report constructed under the control of the processor 120 and transmitted via the transceiver 112. Alternatively, the measurements may be directly reported.

In one example embodiment, in order for the processor 120 to perform the steps described above, the memory stores a computer program (CP) 135 with computer program instructions, which when run by the processor 120, causes the UE to perform all or some of the steps described above.

The memory 130 of user equipment 100 may for example be a flash memory, a RAM (Random-access memory) ROM (Read-Only Memory) or an EEPROM (Electrically Erasable Programmable ROM), and the computer program instructions may in alternative embodiments be distributed on additional memories (not shown) in user equipment 700. The processor may not only be a single CPU (Central processing unit), but could comprise two or more processing units in user equipment 700. For example, the processor may include general purpose microprocessors, instruction set processors and/or related chips sets and/or special purpose microprocessors such as ASICs (Application Specific Integrated Circuit). The processor may also comprise board memory for caching purposes.

The technology described above provides refined and improved accuracy of measurement reports that ultimately provide more specific and more valid information for resource allocation thereby improving a user's perceived performance of service quality and the system capacity. The technology also extends the flexibility of the measurement, enabling tailored measurements for different radio network deployment alternatives, for example, HetNet. Such measurement flexibility is also useful for different frequency and power network planning strategies, such as Almost Blank Subframe (ABS).

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method implemented in a user equipment (UE) for enabling operations related specifically to individual channels in a wireless communication network comprising the UE and a network node being in connectivity with each other, the method comprising:
receiving a signal measurement configuration indicating a subset of radio resource elements in a time-frequency grid on which the UE should perform one or more signal quality measurements, where the subset of the radio resource elements is less than a total number of the radio resource elements in the time-frequency grid and corresponds to an individual radio channel;
receiving a radio signal which includes the time-frequency grid of radio resource elements;
measuring by the UE a signal quality parameter associated with the subset of the radio resource elements in the time-frequency grid indicated by the received signal measurement configuration; and
reporting to a network node the signal quality parameter measured for the subset of the radio resource elements in the time-frequency grid to enable at least one operation related specifically to the individual radio channel.

2. The method in claim 1, wherein the time-frequency grid corresponds to one subframe, and wherein the subset of the radio resource elements is a subset of symbols within the one subframe.

3. The method in claim 1, wherein the time-frequency grid corresponds to one subframe of orthogonal frequency division multiple access (OFDM) symbols.

4. The method in claim 1, wherein the time-frequency grid includes multiple radio channels in addition to the individual radio channel, where each of the multiple radio channels includes a different subset of the radio resource elements.

5. The method in claim 4, wherein the UE measures and reports a signal quality parameter for each subset of the radio resource elements in the time-frequency grid corresponding to plural ones of the multiple radio channels.

6. The method in claim 4, wherein one of the multiple radio channels is a control channel and another of the multiple radio channels is a shared data channel.

7. The method in claim 4, wherein the time-frequency grid includes a reference signal assigned to a subset of the radio resource elements different from those radio resource elements corresponding to the multiple radio channels, and
wherein the UE measures and reports a signal quality parameter specific to just the subset of the radio resource elements in the time-frequency grid corresponding to the reference signal.

8. The method in claim 1, wherein the signal measurement configuration is provided to the UE as a radio resource control message that includes an information element (IE) specifying the subset.

9. The method in claim 1, wherein the signal quality parameter includes one or more of Reference Signal Received Power (RSRP), Reference Signal Received Quality (RSRQ), and/or Channel State Information (CSI).

10. The method in claim 1, further comprising:
measuring by the UE a signal quality parameter associated with the subset of the radio resource elements in the time-frequency grid on a sequence of received time-frequency grids according to a time sequence pattern identifying time-frequency grids to be measured by the UE and reported to the network.

11. User equipment (UE) apparatus for enabling operations related specifically to individual channels in a wireless communication network comprising the UE and a network node being in connectivity with each other, the UE apparatus comprising:
a receiver configured to:
receive a signal measurement configuration indicating a subset of radio resource elements in a time-frequency grid on which the UE should perform one or more signal quality measurements, where the subset of the radio resource elements is less than a total number of the radio resource elements in the time-frequency grid and corresponds to an individual radio channel; and
receive a radio signal which includes the time-frequency grid of radio resource elements;
a detector configured to measure a signal quality parameter associated with the subset of the radio resource elements in the time-frequency grid indicated by the signal measurement configuration; and
radio circuitry configured to report to a network node the signal quality parameter measured for the subset of the radio resource elements in the time-frequency grid to enable an operation related to the individual radio channel.

12. The UE apparatus in claim 11, wherein the time-frequency grid corresponds to one subframe, and wherein the subset of the radio resource elements is a subset of symbols within the one subframe.

13. The UE apparatus in claim 11, wherein the time-frequency grid corresponds to one subframe of orthogonal frequency division multiple access (OFDM) symbols.

14. The UE apparatus in claim 11, wherein the time-frequency grid includes multiple radio channels in addition to the individual radio channel, where each of the multiple radio channels includes a different subset of the radio resource elements.

15. The UE apparatus in claim 14, wherein the detector is configured to measure and the radio circuitry is configured to report a signal quality parameter for each subset of the radio resource elements in the time-frequency grid corresponding to plural ones of the multiple radio channels.

16. The UE apparatus in claim 14, wherein one of the multiple radio channels is a control channel and another of the multiple radio channels is a shared data channel.

17. The UE apparatus in claim 14, wherein the time-frequency grid includes a reference signal assigned to a subset of the radio resource elements different from those radio resource elements corresponding to the multiple radio channels, and
wherein the detector is configured to measure and the radio circuitry is configured to report a signal quality parameter specific to just the subset of the radio resource elements in the time-frequency grid corresponding to the reference signal.

18. The UE apparatus in claim 11, wherein the receiver is configured to receive the signal measurement configuration as a radio resource control message that includes an information element (IE) specifying the subset.

19. The UE apparatus in claim 11, wherein the signal quality parameter includes one or more of Reference Signal Received Power (RSRP), Reference Signal Received Quality (RSRQ), and/or Channel State Information (CSI).

20. The UE apparatus in claim 11, wherein the detector is configured to measure and the radio circuitry is configured to report a signal quality parameter associated with the subset of the radio resource elements in the time-frequency grid on a sequence of received time-frequency grids according to a time sequence pattern identifying time-frequency grids to be measured by the UE.

* * * * *